(12) United States Patent
Barkan et al.

(10) Patent No.: US 7,350,707 B2
(45) Date of Patent: Apr. 1, 2008

(54) DEVICE FOR DIGITIZING AND PROCESSING CHECKS AND DRIVER LICENSES

(75) Inventors: Edward Barkan, Miller Place, NY (US); Mehul Patel, Fort Salonga, NY (US); Robert Sanders, Saint James, NY (US); Christopher Brock, Manorville, NY (US); Alan J. Quinn, Wading River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/197,027

(22) Filed: Aug. 4, 2005

(65) Prior Publication Data

US 2006/0022034 A1 Feb. 2, 2006

Related U.S. Application Data

(63) Continuation-in-part of application No. 10/901,624, filed on Jul. 29, 2004, now Pat. No. 7,281,657.

(51) Int. Cl.
*G06K 7/10* (2006.01)

(52) U.S. Cl. .................. 235/454; 705/39; 382/112; 382/137

(58) Field of Classification Search ................ 235/454; 340/146.3 E; 382/112, 137; 705/39
See application file for complete search history.

(56) References Cited

U.S. PATENT DOCUMENTS

| | | | |
|---|---|---|---|
| 4,048,618 A | 9/1977 | Hendry | |
| 6,547,132 B1 * | 4/2003 | Templeton et al. | 235/380 |
| 6,678,664 B1 * | 1/2004 | Ganesan | 705/39 |
| 6,785,405 B2 * | 8/2004 | Tuttle et al. | 382/112 |
| 6,854,642 B2 * | 2/2005 | Metcalf et al. | 235/375 |
| 6,870,947 B2 * | 3/2005 | Kelland | 382/137 |
| 2002/0195485 A1 | 12/2002 | Pomerleau et al. | |
| 2003/0071116 A1 | 4/2003 | Valbh | |
| 2003/0097332 A1 * | 5/2003 | Golasinski et al. | 705/40 |
| 2003/0128866 A1 * | 7/2003 | McNeal | 382/115 |
| 2003/0222135 A1 * | 12/2003 | Stoutenburg et al. | 235/379 |
| 2004/0044606 A1 | 3/2004 | Buttridge et al. | |

OTHER PUBLICATIONS

International Search Report.

\* cited by examiner

*Primary Examiner*—Michael G. Lee
*Assistant Examiner*—Kristy A. Haupt
(74) *Attorney, Agent, or Firm*—Carter, DeLuca, Farrell & Schmidt, LLP (57) ABSTRACT

An integrated platform is provided for digitizing checks, driver licenses, and other documents, including the processing of the digitized checks in accordance with Check 21 standards and requirements and processing of driver licenses to obtain identification data, and for reading and decoding optical codes. The integrated platform includes a document scanner for digitizing checks, driver licenses, and other documents, and a data capture device for imaging and scanning optical codes, sensing RFID optical code signals, reading magnetic bars and smart cards. The processor executes application software for processing the digitized checks in accordance with Check 21 standards and requirements, for processing the digitized driver licenses, and for operating the data capture device.

29 Claims, 3 Drawing Sheets

DEVICE FOR DIGITIZING AND PROCESSING CHECKS AND DRIVER LICENSES

PRIORITY

This patent application is a continuation-in-part application claiming priority under 35 U.S.C. Section 120 to a patent application filed on Jul. 29, 2004, now U.S. Pat. No. 7,281,657, and assigned U.S. patent application Ser. No. 10/901,624, the entire contents of which are hereby incorporated by reference herein.

BACKGROUND

1. Technical Field

This disclosure relates to a device for performing multiple tasks. More particularly, the present disclosure relates to a device for digitizing documents and reading and decoding optical codes, such as bar codes, DPM codes and RFID codes. Even more particularly, the present disclosure relates to a device for digitizing and processing checks in accordance with the standards and requirements of the Check 21 Act and driver licenses and obtaining identification data therefrom as well as for reading and decoding optical codes, such as PDF codes.

2. Description of the Related Art

The Check 21 Act signed into law by the President of the United States in October 2003 establishes a legal basis for an electronic form of check. In the United States, after the law takes effect in October 2004, mandatory acceptance of the new digital check will be required. For example, banks and other financial institutions will be required to accept a digital image to clear checks, thereby making check processing, including check authentication, much faster and reducing check fraud.

In order to conform with the Check 21 Act, checks have to be digitized before being presented to be cleared via automated check clearing processing. Digitization can be performed by business establishments accepting checks by mail or at a point-of-sale, such as retail establishments, service providers (telephone companies, satellite television companies, etc.); education institutions; and banks of a first deposit, such as financial institutions who accept checks for deposit.

In addition, retailers also have to capture images of driver licenses or read personal data file (PDF) barcodes included on the back of the licenses for a variety of reasons. For instance, the retailers use the information from the driver licenses for age verification or automatically populate data fields of a credit application.

As is known in the art, checks and driver licenses, like many documents, can be digitized using scanning or imaging devices, such as handheld area scanners, operating on particular platforms and the resulting digital images being stored in databases. Typically, business establishments and financial institutions utilize prior art document scanners/imagers to scan and digitize checks and driver licenses. However, other businesses in an effort to forego the cost of document scanners/imagers rely on barcode scanners or imagers for reading and decoding barcodes and also digitizing documents. However, prior art document scanners/imagers and barcode scanners/imagers are not generally practical or feasible to scan checks and driver licenses at a POS location.

Additionally, in order for the POS scanning/imaging devices to communicate the imaged documents to a computer terminal, custom application software is generally required, including communication protocols and hardware. Custom application software is also required for performing Check 21 processing methodologies to process the digitized checks in accordance with Check 21 standards and requirement before presenting the digitized checks for clearing. This results in an increase in set-up, maintenance and operating costs.

A need therefore exists for an integrated platform enabling the digitization of checks, driver licenses and other documents, including the processing of checks in accordance with Check 21 standards and requirements, and the performance of additional tasks, such as reading and decoding optical codes, such as bar codes, PDF codes, DPM codes and RFID codes, at POS locations.

Additionally, a need exists for a device for digitizing driver licenses and checks, as well as processing the digitized checks in accordance with Check 21 standards and requirements, when operating in a first mode, and for imaging, laser scanning, sensing, reading and decoding optical codes when operating in a second mode, at POS locations.

SUMMARY

It is an aspect of the present disclosure to provide an integrated platform enabling the digitization of checks, driver licenses and other documents, including the processing of checks in accordance with Check 21 standards and requirements, processing of digitized driver licenses to obtain identification data, and the performance of additional tasks, such as reading and decoding optical codes, such as bar codes, PDF codes, DPM codes and RFID codes, at POS locations.

Another aspect of the present disclosure is to provide a device for digitizing and processing checks in accordance with Check 21 standards and requirements and for reading and decoding optical codes.

Another aspect of the present disclosure is to provide a device for digitizing and processing driver licenses to obtain identification data and for reading and decoding optical codes.

Another aspect of the present disclosure is to provide a device for digitizing driver licenses and checks, as well as processing the digitized checks in accordance with Check 21 standards and requirements, when operating in a first mode, and for imaging, laser scanning, sensing, reading and decoding optical codes when operating in a second mode, at POS locations.

In accordance with the above aspects, the present disclosure provides an integrated platform preferably configured as a single device for POS locations. The device includes a processor for digitizing driver licenses and other documents, such as checks, when operating in a first mode, and for reading and decoding optical codes, such as bar codes, DPM codes and RFID codes, when operating in a second mode. An actuation mechanism, such as a trigger assembly, button, switch, and motion or other type of sensor, is included for actuating and/or switching the device between the first and second modes.

The platform includes a document scanner or digitizer for digitizing driver licenses and checks. The processor executes application software for processing the digitized driver licenses to obtain identification data and for processing the digitized checks such as in accordance with the Check 21 Act. The processor also executes optical code application software for operating an optical code/RFID reader or data capture device.

The data capture device includes several data capture modules for capturing data, including data encoded within optical codes or optical code signals. The data capture modules preferably include an imaging module for imaging optical codes, a laser scanning module for scanning optical codes using a laser beam, an RFID reading module for sensing RFID optical code signals transmitted from RFID tags, a signature capture module for capturing and digitizing a signature, and a smart card reader and/or magnetic stripe reader. The modules generate optical code data which are transmitted to the processor for decoding as known in the art.

According to another embodiment of the present disclosure, a method for authenticating identity of a check presenter is disclosed. The method includes the steps of scanning a check to obtain first data identifying the check presenter and obtaining second data identifying the check presenter from a source other than the check, e.g., a driver license. The method also includes the step of comparing the first and second data to authenticate the identity of the check presenter.

BRIEF DESCRIPTION OF THE DRAWINGS

Various embodiments of the disclosure are described herein below with reference to the figures wherein.

DETAILED DESCRIPTION OF THE PREFERRED EMBODIMENTS

Figure 1:
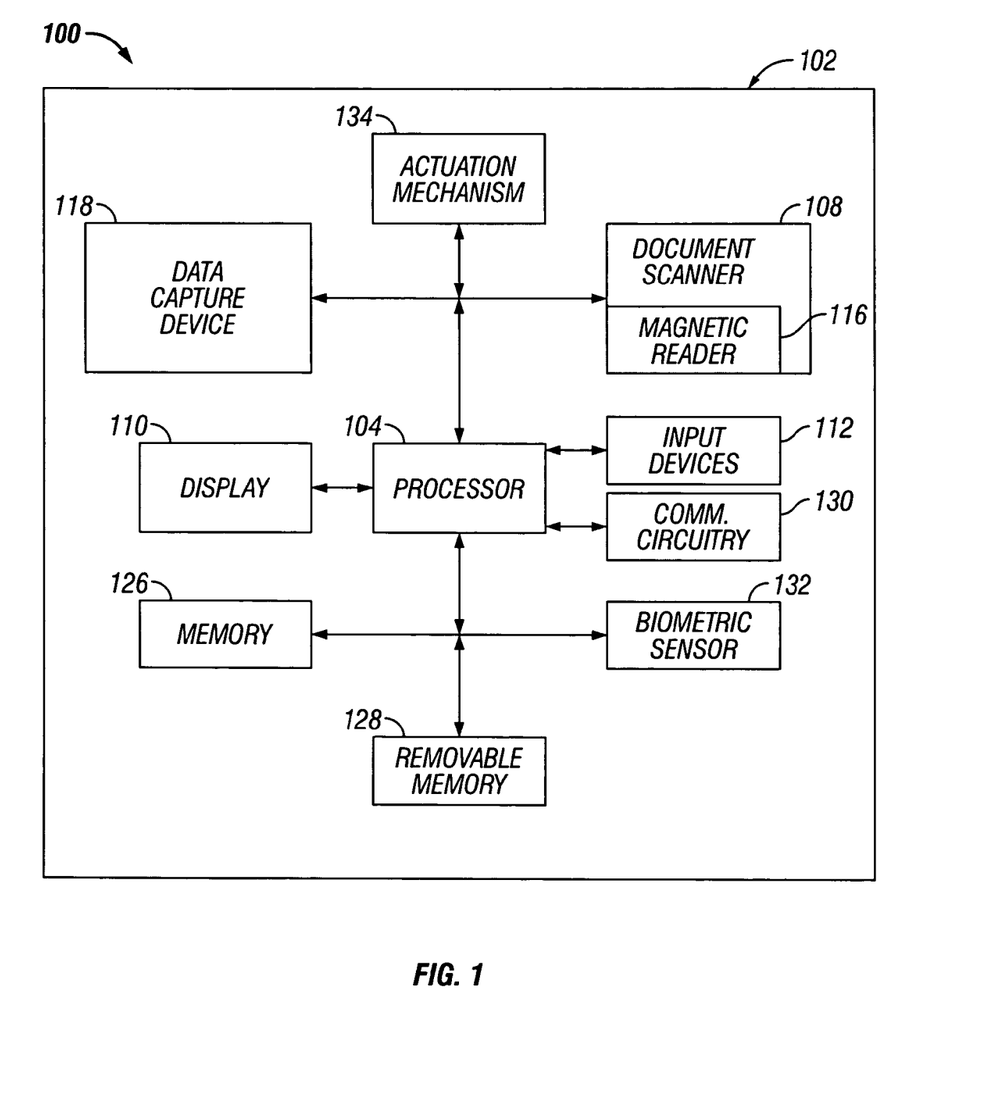
FIG. 1 is a block diagram of an integrated platform for digitizing and processing checks in accordance with Check 21 standards and requirements, and for reading and decoding optical codes in accordance with the present disclosure.

With reference to FIG. 1, a schematic block diagram of an exemplary integrated platform for digitizing and processing driver licenses to obtain identification data and checks, in accordance with Check 21 standards and requirements when operating in a first mode, and for reading and decoding optical codes when operating in a second mode, in accordance with the present disclosure is shown. It is envisioned that the integrated platform described herein in accordance with the various embodiments can be configured for operating in a single mode, i.e., all the functions of the integrated platform described herein are performed when operating the integrated platform in the single mode. In this embodiment, there is no switching between first and second modes.

Figure 2:
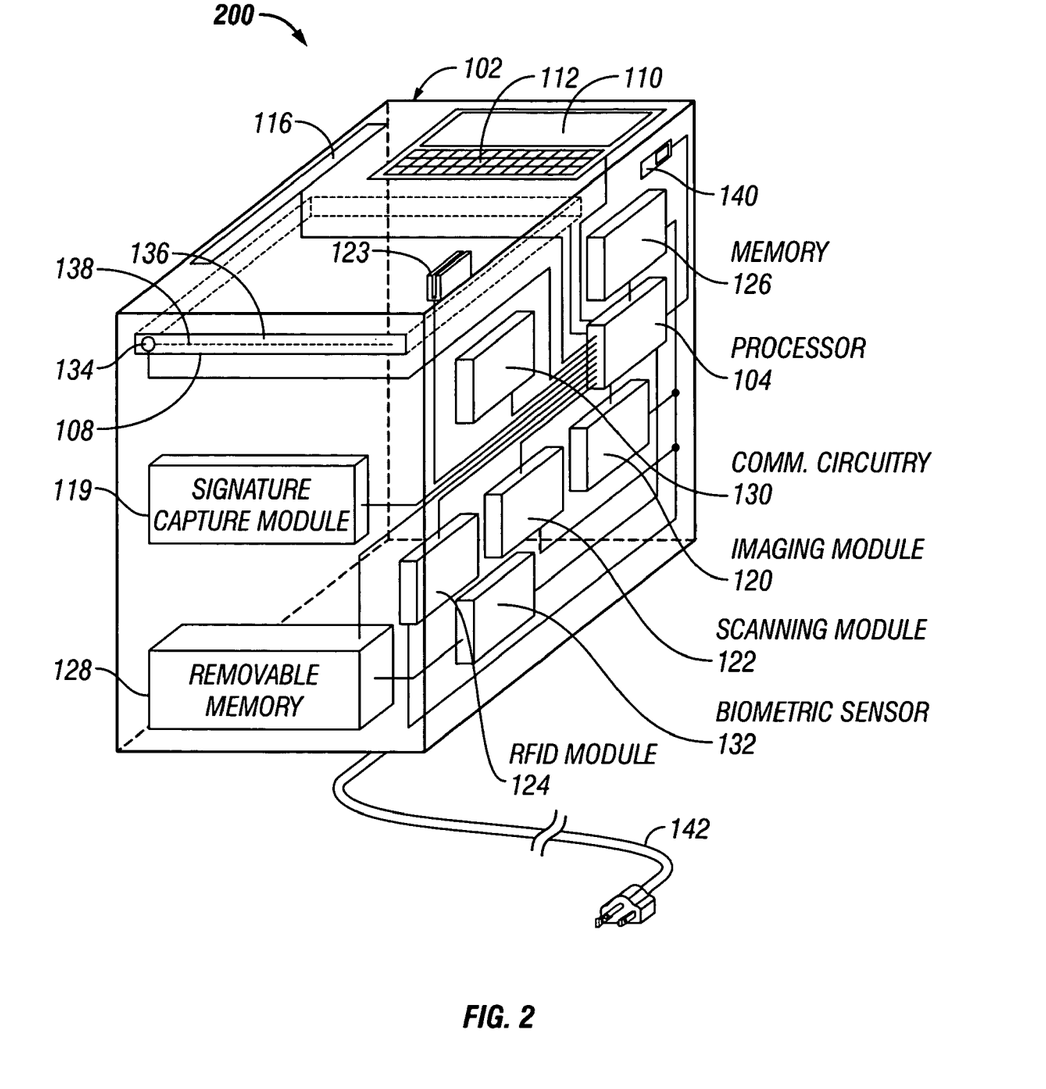
FIG. 2 is a schematic diagram of a device in accordance with the present disclosure.

The integrated platform designated generally by reference numeral 100 is preferably configured as a single device 100 as shown in FIG. 2. The device 100 includes a processor 104 for digitizing checks, driver licenses, and other documents. The processor 104 when operating in the first mode is configured to process checks in accordance with Check 21 standards and requirements and the digitized driver licenses to obtain identification data. When operating in the second mode, the processor 104 is configured for reading and decoding optical codes, such as bar codes, DPM codes, and PDF codes and RFID codes. An actuation mechanism 106, such as a trigger assembly, button, switch, and motion or other type of sensor, is included for actuating and/or switching the integrated platform 100 between the first and second modes.

The device 100 includes a document scanner or digitizer 108 for digitizing checks, driver licenses and other documents. The document scanner 108 preferably scans and images the front and back sides of a check or driver license and creates copies of the substitute checks, as required by the Check 21 Act, and of the driver licenses.

In accordance with the Check 21 Act, substitute checks are the legal equivalent of the original checks so long as they accurately represent all of the information on the front and back of the original checks and bear the MICR (Magnetic Ink Character Recognition) line according to the precise standards set by the American National Standards Institute (ANSI). Further, in accordance with the Check 21 Act, substitute checks will bear the legend: "This is a legal copy of your check. You can use it the same way you would use the original check." The Check 21 Act further provides that "reconverting banks," that is those institutions that convert electronic images into paper substitute checks, must identify themselves on the substitute check.

Accordingly, the processor 104 executes Check 21 application software for operating the document scanner 108 and for processing the digitized checks, including authenticating the digitized checks, in accordance with check presentment procedures and regulations as well as Check 21 standards and requirements. The processor 104 upon executing the Check 21 application software determines the characters of the MICR line for each digitized check using image processing and parsing techniques as known in the art. The processor 104 then generates the MICR line.

The application software includes instructions for being executed by the processor 104 for providing the generated MICR line to the corresponding digitized check as an overlay and/or sidebar, such that each digitized check bears the proper MICR line in accordance with the requirements of the Check 21 Act after being digitized. The MICR line is subsequently used to clear the digitized checks, or other substitute checks derived from the digitized checks, using automated check clearing processing.

The processor 104 also upon executing the Check 21 application software provides the legend required for each check to bear by the Check 21 Act. The processor provides the legend: "This is a legal copy of your check. You can use it the same way you would use the original check," (or other legend conveying the same or similar message) to each digitized check in accordance with the requirements of the Check 21 Act. The legend can be provided as an overlay to the digitized check and/or as a sidebar to the digitized check. The Check 21 application software also identifies the names of the "reconverting banks," as required by the Check 21 Act, to each digitized check. The names of the "reconverting banks" can be identified via an overlay and/or sidebar for each digitized check.

The processor 104 also operates the document scanner 108 to obtain digitized images of driver licenses. Once the driver license is scanned, the processor 104 processes the obtained image (e.g., analyzing data contained on the license, such as date of birth, name, etc.). Similar to determination of MICR line characters, the processor 104 uses text-recognition software to parse the text of the driver license to obtain identification data concerning the person who holds the driver license, such as address, date of birth, name, etc. Certain driver licenses include magnetic strips and/or PDF codes which can be read by using a data capture device 118, to obtain the identification data, such techniques are discussed in more detail below.

The identification data is used to authenticate the identity of the person presenting the check. Text-recognition software may be used to obtain identification data from the check (e.g., name, address, etc.). The identification data from the check and the driver license can be compared to authenticate the check. The check is authenticated when the identification data from the driver license matches the identification data from the check.

The processor 104 can also execute application software for performing other functions related to the scanned and digitized documents, such as document storage and retrieval, database management, and parsing the digitized images.

After digitization, the digitized checks and/or licenses can be stored as one or more files within a memory 126 of the device and are viewable via a display 110. The display 110 can be a touch-screen display. The display 110 also displays information regarding a scanned item, such as a description of the scanned item and the corresponding price. Input devices 112, such as a standard alphanumeric keyboard and a track ball, can be used to input data to the device 100, such as the names of the "reconverting banks" and to perform other functions, such as manage data, and access a memory 114 for viewing digitized documents.

The device 100 further includes a magnetic reader 116 for reading magnetic stripes on driver licenses and/or checks for post-processing and/or post-authentication of checks by the processor 104. The magnetic reader 116 can also be used to swipe credit and debit cards for payment processing purposes as known in the art. The magnetic reader 116 can be part of the document scanner 108 as shown by FIG. 1. Accordingly, the device 100 is a complete point-of-sale terminal capable of performing checkout and payment processing procedures, as well as electronic check presentment procedures where the check is presented, digitized and the original check is given back to the check presenter, and the storage of driver license information.

When operating in the second mode, the processor 104 executes optical code application software for operating an optical code/RFID reader or data capture device 118. The data capture device 118 includes several data capture modules for capturing data, including data encoded within optical codes or optical code signals. The data capture modules preferably include a signature capture module 119 for capturing and digitizing signatures, an imaging module 120 for imaging optical codes, a laser scanning module 122 for scanning optical codes using a laser beam, and an RFID reading module 124 for sensing RFID optical code signals transmitted from RFID tags, and a smart card reader 123 for reading data stored in the smart card chip. It is envisioned that the smart card reader 121 also reads magnetic stripes since most of the smart cards are on plastic cards which include a magnetic strip for storing additional data. The smart card reader 123 can communicate with the smart card chip for reading the smart card chip either using contact or non-contact means as is known in the art.

The data capture device 118 may also be configured to read PDF barcodes which are generally two-dimensional barcodes containing identification data about the license holder.

As is known in the art, the imaging module 120, laser scanning module 122, RFID reading module 124, and smart card reader 123 generate optical code data indicative of the optical code imaged, scanned, sensed or read. The optical code data is transmitted to the processor 104 for post-processing.

After receiving the optical code data (e.g., from a PDF code) the processor 104 reads and decodes the optical code data by executing one or more decoding algorithms corresponding to a plurality of optical code symbologies as known in the art. The decoding algorithms are stored within the memory 126, such as FLASH, RAM, ROM, and EPROM, and/or within a removable memory 128, such as hard drive, CD-ROM, diskette, and removable memory cards, such as compact flash and PCMCIA.

The processor 104 generates a signal, such as an audible sound, if the optical code data are successfully read and decoded. If a no-read occurs, the processor 104 generates a different signal. The processor 104 can operate the document scanner 108 and the data capture device 118 simultaneously for performing two or more functions at the same time using parallel processing methodologies. The processor 104 can also indicate a successful or non-successful decode operation via the display 110.

The device 100 further includes communication circuitry 130 for communicating with an external host processor or other processor. The communication circuitry 130 can include components for performing wireless and non-wireless communications for transmitting and receiving data, such as data related to the processed and authenticated checks, decoding algorithms, and receiving software updates, including receiving software updates for the processing of the licenses and digitized checks in accordance with Check 21 standards and requirements. The communication circuitry 130 also enables the device 100 to transmit diagnostic information which can indicate detection of a failure or an impending failure of one of the device's components.

The processor 104 executes communication application software for operating the communication circuitry 130, including enabling the communication circuitry 130 to establish a network connection, such as an Internet connection, for transmitting and receiving data packets over a network, such as the Internet. The digitized checks and/or driver licenses are stored in the memory 126 and/or removable memory 128. The checks are transmitted by the communication circuitry 130 to an external processor or financial system to be cleared in accordance with Check 21 standards and requirements, and/or electronic check clearing procedures. The licenses may be transmitted to credit clearing agencies or other information processing centers for authentication and other purposes.

The device 100 further includes at least one biometric sensor 132 for authenticating the identity of an individual presenting a check and/or driver license to a user of the device 100 to be processed. The biometric sensor 132 scans, for example, the individual's eye, fingerprint and facial characteristics, and maps the scanned image to an image stored within the memory 126 or removable memory 128 or an external database accessible via the communication circuitry 130. Each of the stored images corresponds to a particular individual. Accordingly, if the scanned image corresponds to a stored image, the device 100 can successfully authenticate the individual's identity.

Those skilled in the art will appreciate that alternatively the driver license could be used in place of a biometric identification (or in addition to) because the license already includes a photograph and other identifying information which may be used to confirm the person's identity.

One embodiment of the device 100 having a slot-fed scanning mechanism configured to digitize checks will now be discussed with reference to FIG. 2 as device 200. The device 200 includes the components of the device 100 discussed above and allows its user to switch between a two modes: a digitizing mode—obtaining images of check documents and scanning mode—reading bar codes. In order to switch between the first mode, which involves scanning driver licenses, and second mode, which involves reading/ decoding optical codes, the device 200 includes an actuation mechanism 134, such as a trigger assembly, button, switch, and motion or other type of sensor, for actuating and/or switching the device 200 to operate in the first or second mode. FIG. 2 illustrates the actuation mechanism 134 as an infrared sensor.

The infrared sensor determines whether a check is positioned within a check-receiving slot 136 of the document scanner 108. If a check is positioned within the check-receiving slot 136, an infrared light beam 138 emitted by the infrared sensor is intercepted and a signal is sent to the processor 104 for operating the device 200 in the first mode. If the infrared light beam 138 is not intercepted, the signal is not sent to the processor 104 and the device 200 operates in the second mode.

In an alternate embodiment, the device 200 is configured for operating in the first and second modes simultaneously in order to scan, image and digitize checks, including processing checks in accordance with Check 21 standards and requirements (or scan and read magnetic stripes), while imaging optical codes, scanning optical codes, and/or sensing RFID optical code signals.

The device 200 includes a power switch 140 and an electrical cord 142 for plugging the device to a power source or electrical outlet. The device 200 can also be configured for being operated by a battery. Alternatively, the device 200 is not provided with the power switch 140, but the processor 104 is programmed to have the device 200 automatically go into a reduced power mode when the device 200 has not been used for a predetermined period of time. The device 200 exits the reduced power mode when a user attempts to use the device 200. Further, the device 200 can be powered up and down via commands received from a remote or local terminal.

Another actuation mechanism can be provided for determining whether a credit or debit card is being swiped using the magnetic reader 116 or imaged using the imaging module 120. If a credit or debit card is being swiped or imaged, the actuation mechanism prevents the device 200 from being operated in the first and second modes.

The device 200 also includes the smart card reader 123 configured to read smart card chips using contact and non-contact means as is known in the art. In addition, the smart card reader 123 also includes a magnetic stripe reader to read magnetic stripes found on many cards bearing smart card chips.

Figure 3:
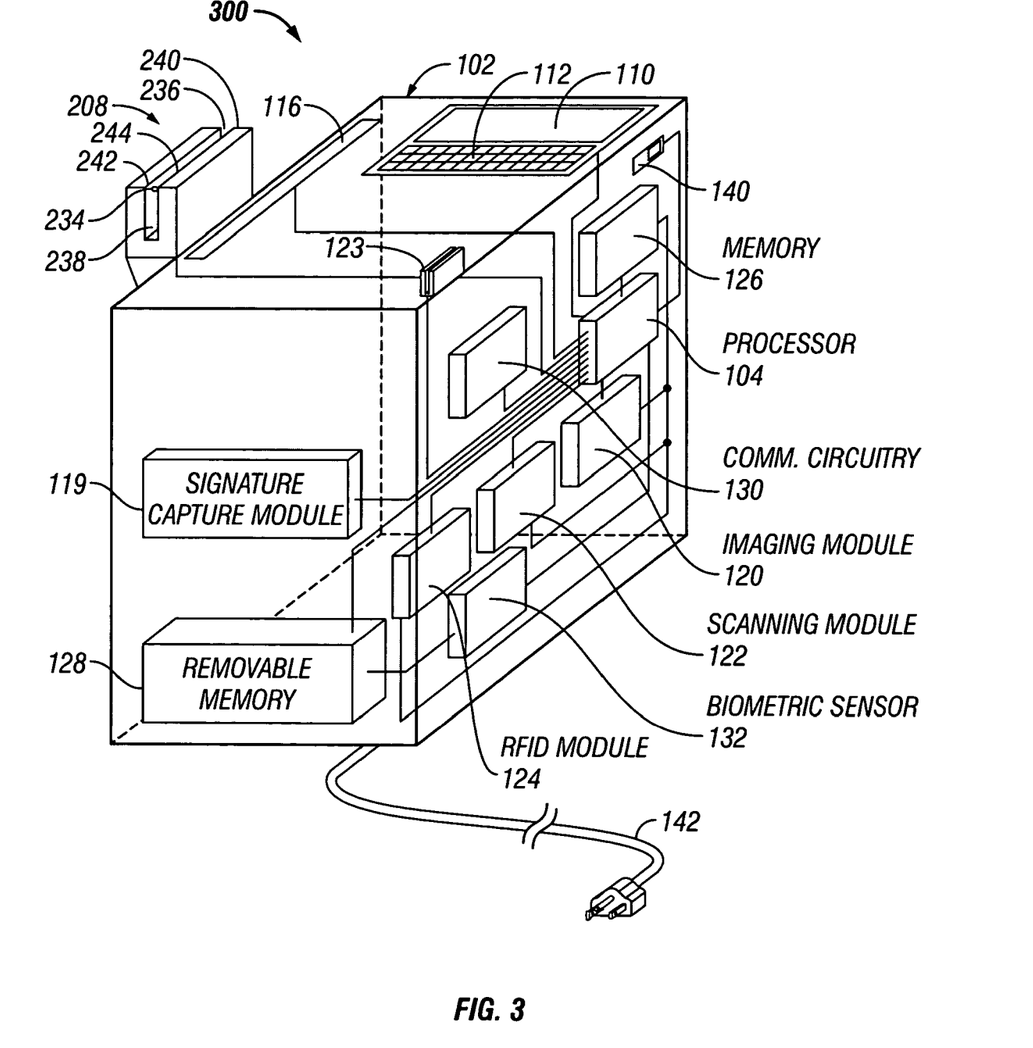
FIG. 3 is a schematic diagram of an alternative embodiment of a device in accordance with the present disclosure.

With reference to FIG. 3, an alternative embodiment of the device 200 is shown as a device 300 having similar components as device 200 and a document scanner 208, which is a swipe-type scanner designed to scan and image documents, such as driver licenses. The document scanner 208 can be used to capture images and/or read bar codes and other optical codes on discount coupons, thereby eliminating the need to handle paper coupons during a redemption process at the POS site.

In order to switch between the first mode, which involves scanning and imagining documents, such as driver licenses, and second mode, which involves reading/decoding optical codes as described above for the other embodiments, the device 300 includes an actuation mechanism 234, such as a trigger assembly, button, switch, and motion or other type of sensor, for actuating and/or switching the device 300 to operate in the first or second mode. FIG. 3 illustrates the actuation mechanism 234 as an infrared sensor. It is envisioned that the device 200 can be configured for performing all functions described herein in a single mode.

In the first mode, the driver license is inserted into the license receiving slot 236 at a proximal end 238 of the scanner 208. The infrared sensor 234 determines whether the driver license is positioned within a check-receiving slot 236 of the document scanner 208. If the driver license is positioned within the check-receiving slot 236, an infrared light beam (not shown) emitted by the infrared sensor is intercepted and a signal is sent to the processor 104 for operating the device 300 in the first mode. If the infrared light beam is not intercepted, the signal is not sent to the processor 104 and the device 100 operates in the second mode.

The image of the driver license is obtained as the license is swiped through the slot 236 from the proximal end 238 to a distal end 240 of the scanner 208. The scanner 208 can use a single linear sensor or an area image sensor. A linear sensor can create a two-dimensional image by assembling a multitude of scan lines as is known in the art. Once the driver license is inserted into the slot 236, the linear sensor is moved across the surface of the license (e.g., vertically or horizontally) to capture the image thereof or a rotating mirror can be used to scan the entire surface if the sensor is kept stationary. Alternatively, if an area image sensor is used, the entire image of the license is captured without moving the sensor. In this sense, the imaging module 120 can also be used to image one or both sides of the driver license instead of the scanner 208. It is envisioned that the scanner 208 can use a laser scanner for rastering the driver license and reading a PDF symbology on the driver license without requiring any movement of the driver license within the slot 236.

The scanner 208 may be disposed within a front side 244 or a back side 242 of the slot 236. This requires that the person swiping the driver license properly orient the card prior to swiping to ensure that the front face faces the sensor. In addition, a sensor may be disposed at the front and back sides 244, 242 to obtain the images of both sides of the driver license, and other documents, such as checks, coupons, etc. In this embodiment, orientation of the driver license and other documents within the slot 236 is not important.

The scanner 208 can also include a barcode reader, more specifically a PDF barcode reader. In this embodiment during the swiping of the driver license, the device 300 obtains the image of the front of the license, which generally contains the photo of the person and identifying textual data as well as the back of the license, which generally contains a PDF barcode. For instance, the sensor may be disposed in the front side 244 while the barcode reader may be disposed in the back side 242. Thus, during swiping, the device 300 obtains the image of the driver license as well as the data from the PDF barcode. This embodiment also requires that the driver license be properly oriented to ensure that proper sides are scanned and/or read. Those skilled in the art will understand that the scanner 208 may include one or more imaging sensors and/or barcode readers positioned in a plurality of ways configured to scan specific licenses.

In an alternate embodiment, the device 300 is configured for operating in the first and second modes simultaneously in order to scan, image and digitize driver licenses, and image/decode optical codes, and/or sensing RFID optical code signals.

Once the image of the driver license and/or data from PDF barcode is obtained, the data is processed by the processor 104. The image of the driver license is subjected to textual analysis where textual elements are extracted from the image and then parsed to obtain identification data. The identification data may include the person's name, address, date of birth, driver identification number, and social security number. In addition, if a PDF barcode reader is used, the identification data is obtained from the PDF barcode. It is also envisioned that the identification data collected from the driver license can be transmitted to another device (e.g., credit verification service) using the communication circuitry 130.

Device 300 can also process checks in accordance with the Check 21 Act standards and requirements. Accordingly, the device 100 is a complete point-of-sale terminal capable of performing checkout and payment processing procedures, as well as electronic check presentment procedures where the check is presented, digitized and the original check is given back to the check presenter, and the storage of driver license information.

It is also envisioned that the device 300, which is capable of processing digitized checks and driver licenses, is further configured to authenticate the check being presented using the data collected from the customer. As discussed above, the device 300 can obtain various biometric and identification data from the driver license, such as the person's address, signature, etc. In addition, the signature can be obtained via the device 300 using the signature module 119 or other input means.

The device 300 can also obtain identification information from a check, such as the person's address, bank account, signature, etc. The device 300 verifies the authenticity of the check by comparing the data obtained from the driver license with the data obtained from the check (e.g., matching the signatures, the addresses, etc.). That is, if the data matches, then the check is authentic. The signature obtained via the signature module 119 can also be compared to the signature on the check and/or driver license to further authenticate the identity of the user. The authentication process is preferably performed by the processor 104 and it entails executing data analysis software for determining whether there is a high degree of confidence that the two or more compared signatures match.

It is also envisioned that different biometrics can be used as identifying data, which may be obtained by the device 300 using a fingerprint scanner (not shown) or from driver license, which may include a fingerprint. This allows the device 300 to obtain the identity of the presenter of the check by using biometric data other than identification data. Those skilled in the art will appreciate that identification data and biometric data obtained from a driver license could also be used to verify the identity of the person who is using credit/debit/smart cards.

The device 300 also includes the smart card reader 123 configured to read smart card chips using contact and non-contact means as is known in the art. In addition, the smart card scanner 123 also includes a magnetic stripe reader to read magnetic stripes found on many cards bearing smart card chips.

The device 300 is capable to perform all types of card transactions (e.g., debit, credit, etc.) as well as check transactions. In addition, the device 300 is configured to verify the identity of the check and/or card presenter using the information obtained from a driver license (e.g., identification data, biometric data, etc.).

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A device for digitizing a driver license presented by an individual and decoding optical code data, said device comprising:
   a scanner for scanning and digitizing said driver license;
   at least one data capture module for generating data corresponding to an optical code and RFID tag positioned at a non-contact distance from said at least one data capture module; and
   a processor capable of executing application software for operating said scanner and said at least one data capture module, for processing the digitized driver license to obtain identification data, and for decoding the optical code data, wherein the processor further executes the application software for performing an identity authentication procedure by comparing the identification data with identification data obtained by said device from a document other than said driver license for authenticating the identity of the individual.

2. The device according to claim 1, wherein the scanner is a swipe-type scanner.

3. The device according to claim 2, wherein the swipe-type scanner further includes a data capture module configured for generating optical code data of at least one bar code displayed on said driver license.

4. The device according to claim 1, wherein the scanner is further configured to scan and digitize a check and the processor is further configured to process said digitized check to conform with at least one predetermined requirement.

5. The device according to claim 4, wherein the at least one predetermined requirement is a requirement set forth by the Check 21 Act.

6. The device according to claim 4, wherein the at least one predetermined requirement is selected from the group consisting of providing a message to each digitized check, providing a MICR line to each digitized check, identifying the reconverting banks for each digitized check.

7. The device according to claim 1, wherein the at least one data capture module is selected from the group consisting of an imaging module, a laser scanning module, and a RFID reading module.

8. The device according to claim 1, further comprising communication circuitry controlled by said processor for transmitting the identification data.

9. The device according to claim 1, further comprising an actuation mechanism for transmitting at least one signal to said processor for operating said device between a first and a second mode, wherein in the first mode, said processor operates said scanner and in the second mode, said processor operates said at least one data capture module.

10. The device according to claim 9, wherein said actuation mechanism includes a sensor for determining if a driver license is positioned within a driver license receiving slot of said scanner.

11. The device according to claim 1, further comprising a magnetic reader, a display, a memory and at least one input device in operative communication with said processor.

12. The device according to claim 1, wherein said device is a point-of-sale terminal.

13. The device according to claim 1, further comprising a smart card reader in operative communication with the processor.

14. An integrated platform for digitizing a driver license presented by an individual and decoding optical code data, said device comprising:

a processor executing application software for operating a scanner for scanning and digitizing said driver license, for operating a first data capture module at a first time period for generating data corresponding to an optical code and operating a second data capture module at a second time period for generating data corresponding to an RFID tag positioned at a non-contact distance from said at least one data capture module, for processing the digitized driver license to obtain identification data, and for decoding the optical code data, wherein the processor further executes the application software for performing an identity authentication procedure by comparing identification data obtained by scanning and digitizing said driver license with identification data obtained by said device from a document other than said driver license for authenticating the identity of the individual.

15. The integrated platform according to claim 14, wherein the at least one data capture module is selected from the group consisting of an imaging module, a laser scanning module, and a RFID reading module.

16. The integrated platform according to claim 14, further comprising communication circuitry controlled by said processor for transmitting data including the identification data.

17. The integrated platform according to claim 14, further comprising an actuation mechanism for transmitting at least one signal to said processor for operating said device between a first and a second mode, wherein in the first mode, said processor operates said scanner and in the second mode, said processor operates said at least one data capture module.

18. The integrated platform according to claim 17, wherein said actuation mechanism includes a sensor for determining if a driver license is positioned within a driver license receiving slot of said scanner.

19. The integrated platform according to claim 14, further comprising a magnetic reader, a display, a memory and at least one input device in operative communication with said processor.

20. The integrated platform according to claim 14, further comprising a smart card reader in operative communication with the processor.

21. Integrated platform according to claim 14, wherein the first time period and second time period are the same time period or different time periods.

22. A combination document scanner and optical code data decoding device comprising:

a document scanner for scanning and digitizing at least one document selected from the group consisting of a check and a driver license; and a processor for simultaneously controlling the operation of said scanner for scanning and digitizing said at least one document and operating a first data capture module at a first time period for generating and decoding optical code data corresponding to an optical code and operating the second data capture module at a second time period for generating data corresponding to an RFID tag positioned at a non-contact distance from said at least one data capture module.

23. The device according to claim 22, wherein the at least one data capture module is selected from the group consisting of an imaging module, a laser scanning module, and a RFID reading module.

24. The device according to claim 22, wherein said device is a point-of-sale terminal.

25. The device according to claim 22, wherein the processor processes at least one check to conform with at least one predetermined requirement.

26. The device according to claim 25, wherein the at least one predetermined requirement is a requirement set forth by the Check 21 Act.

27. The device according to claim 25, wherein the at least one predetermined requirement is selected from the group consisting of providing a message to each digitized check, providing a MICR line to each digitized check, identifying the reconverting banks for each digitized check.

28. The device according to claim 22, further comprising a smart card reader in operative communication with the processor.

29. The device according to claim 22, wherein the first time period and second time period are the same time period or different time periods.

* * * * *

UNITED STATES PATENT AND TRADEMARK OFFICE
CERTIFICATE OF CORRECTION

PATENT NO. : 7,350,707 B2  
APPLICATION NO. : 11/197027  
DATED : April 1, 2008  
INVENTOR(S) : Barkan et al.

Page 1 of 1

It is certified that error appears in the above-identified patent and that said Letters Patent is hereby corrected as shown below:

IN THE CLAIMS

In Column 12, Line 1, in Claim 21, insert -- The --, before "Integrated".
(AMENDMENTS TO THE CLAIMS DATED NOVEMBER 9, 2007, PAGE 7, CLAIM 32, LINE 1)

Signed and Sealed this

Twenty-fourth Day of November, 2009

David J. Kappos
*Director of the United States Patent and Trademark Office*